April 10, 1928.

E. B. CADWELL 1,665,685

SNOW REMOVAL APPARATUS

Filed Dec. 31, 1923

INVENTOR
Edwin B. Cadwell
BY
Frank M. Ashley
ATTORNEY

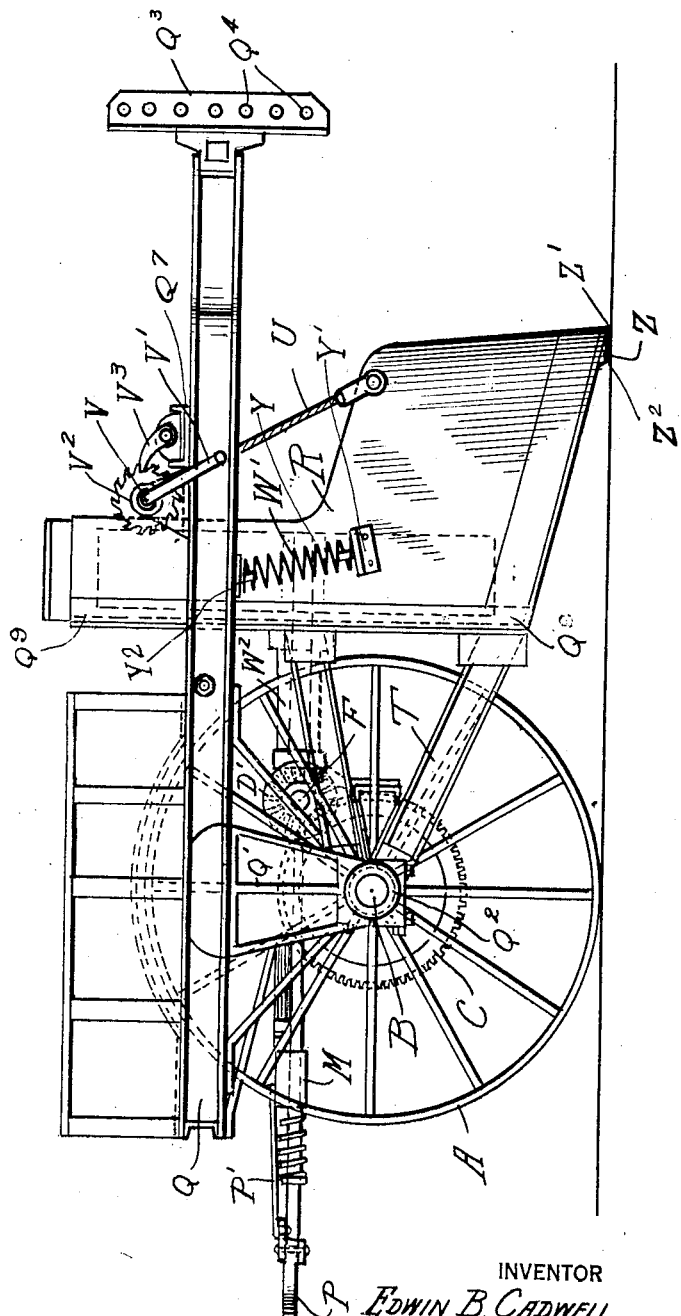

April 10, 1928.

E. B. CADWELL 1,665,685

SNOW REMOVAL APPARATUS

Filed Dec. 31, 1923

INVENTOR
EDWIN B. CADWELL
BY
ATTORNEY

Patented Apr. 10, 1928.

1,665,685

UNITED STATES PATENT OFFICE.

EDWIN B. CADWELL, OF SAUGERTIES, NEW YORK.

SNOW-REMOVAL APPARATUS.

Application filed December 31, 1923. Serial No. 683,638.

My invention relates to machines designed to remove snow from streets and roads, one type of which is generally referred to as a snow plow.

The object of my invention is to provide a machine for the purpose of removing snow from roads and streets and will hereinafter be referred to as a "snow plow".

The main object of my invention is to provide a machine that may be operated by means of any automobile or tractor, or if necessary, by animal power.

A further object is to provide a machine which will convey the snow directly from the roadway into carts for removal.

A further object is to build the machine in unit portions, each portion constituting a section which may be built separately, and in case of an accident may be immediately replaced by a like unit at the lowest expense.

The present machine is composed of three such replaceable sections, and are referred to as The main axle assembly,
The scoop assembly, and
The main frame assembly, respectively.

Referring to the drawings which form a part of these specifications:

Figure 2 is a side view thereof.

Figure 1:
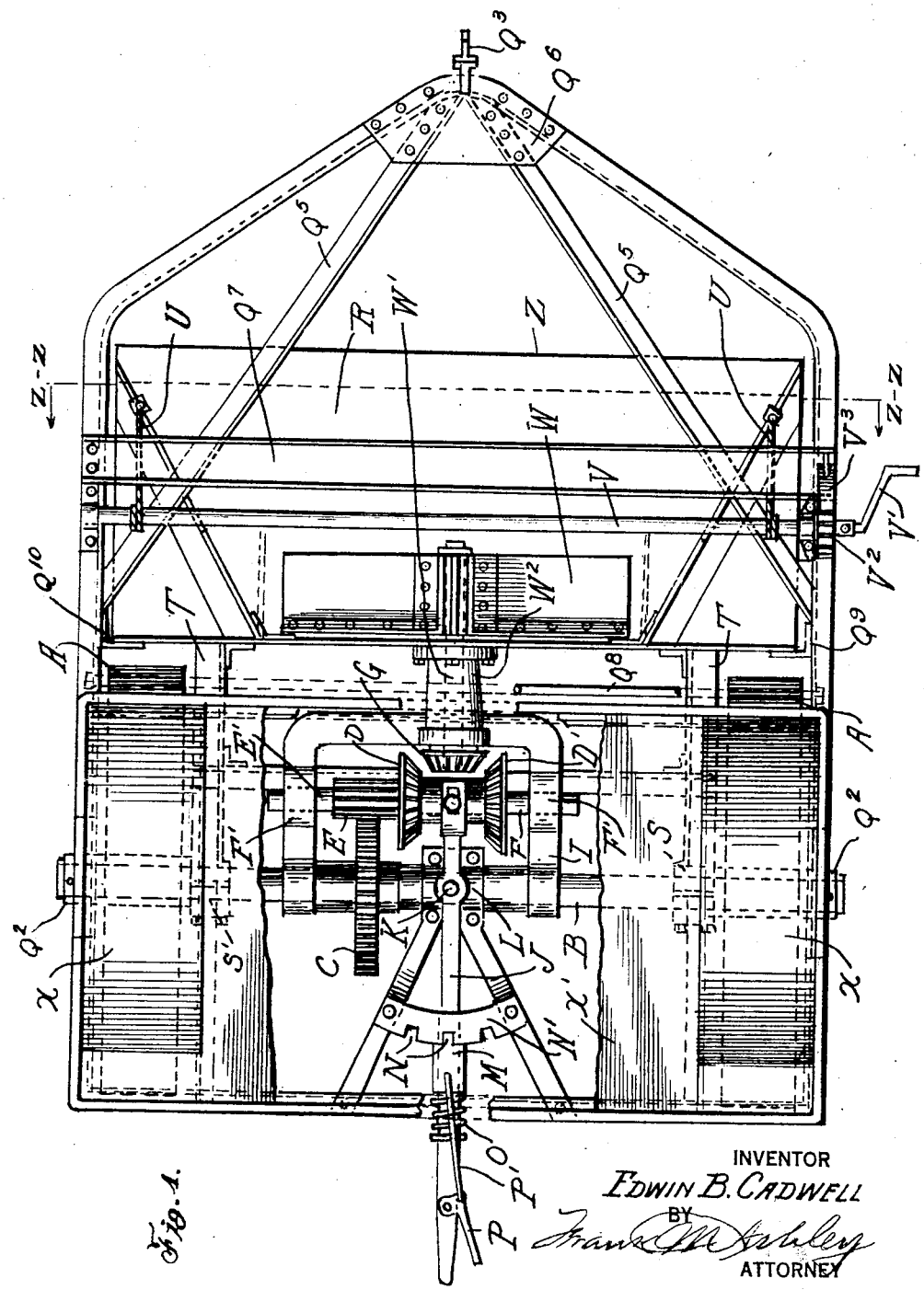
Figure 1 is a general plan view of my improved snow plow.
Figure 4:
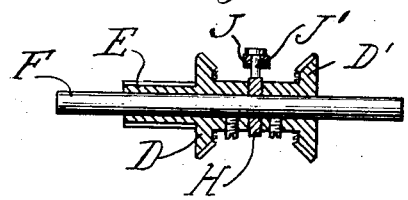
Figure 4 is a detail view of a part of the gearing.
Figure 3:
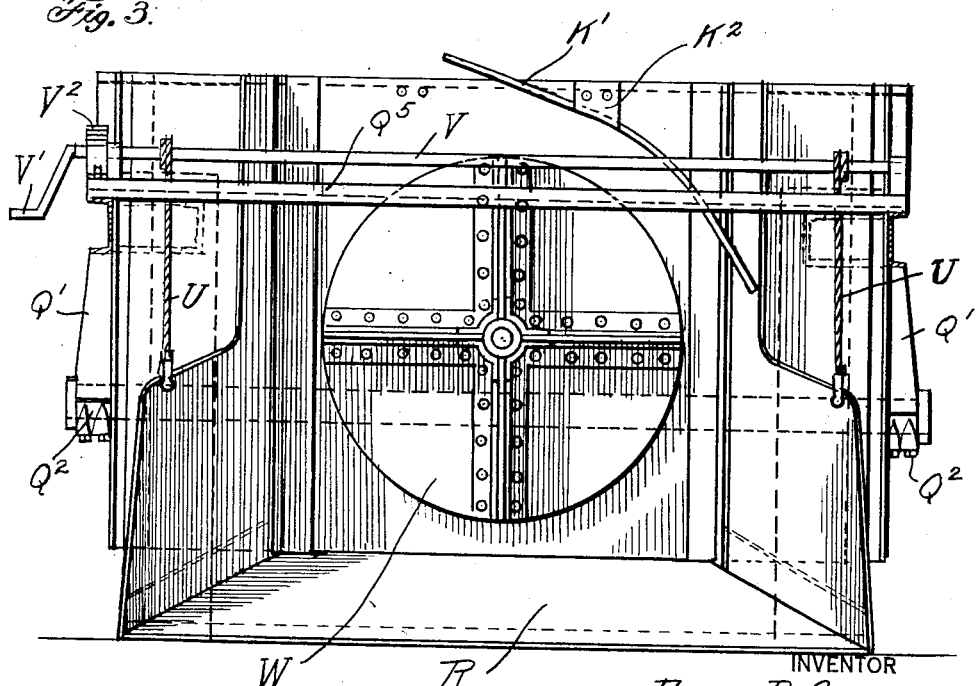
Figure 3 is a front view, partly in section, taken on dotted line Z—Z shown on Figure 1.

The main axle assembly comprises the two tractor wheels—axle and driving gear.

The scoop assembly comprises the plates forming the scoop, and having attached to the rear of it two arms built up from angle irons, which are attached to bearings which allow the scoop to pivot about the main axle.

The main frame assembly comprises a channel steel frame, which has supporting brackets attached to its lower side with bearing bushings fitted on the wheel axle at its outer end. This main frame is arranged to carry the necessary load to provide traction and to support the scoop. The rear end of the frame is covered by #16 gauge plate which is cut away over the wheels to allow the housing being fitted over them. A railing is provided to assist in holding the weight in place.

The method of assembling of these three main units would be to take the main axle assembly and attach the scoop to it, then set the main frame down over this assembly. The main frame is tied together just in front of the scoop by a channel bar which extends thereacross indicated by "Q 7" and a tie rod indicated by "Q 8" at the rear. Tie rod and channel are spaced apart to allow the necessary pivoting movement of the scoop to raise it one foot high; this is with a machine the wheel of which would be 44" high, 8" wide, with a tire 1½" thick; the height from the ground to the bottom of the frame is about 36", the scoop about 6 ft. wide. The gearing is such that when the machine travels at the rate of about eight miles per hour the rotor will rotate four hundred and fifty revolutions per minute.

With the above general description the following details will be more easily understood:

A—A respectively indicate the traction driving wheels which are firmly secured to the driving axle B. Secured to the axle B is a gear wheel C which drives the gears D and D' through the pinion E which is mounted on the same shaft therewith indicated by F, which may be shifted laterally to connect either of them with the rotor shaft gear G, and to disconnect when desired. This is accomplished by placing a collar H loosely fitting on the shaft F between the bevel gears D and D' which are fixed on the shaft, and by moving the collar laterally the shaft F is shifted laterally in its bearings F'—F' respectively carried by the frame I. The collar H is moved by the lever J which collar engages a pin J' mounted on the lever J, the lever being fulcrumed on a pin K carried on the top of a box bearing L which is mounted on the axle B. The lever J is held in its adjusted position by a latch M which is movable on the lever, and engages notches N—N—N respectively formed in the quadrant N', the latch being operated by the members comprising the spring O, handle P, and rod P', as will be readily understood.

The frame Q is supported on the axle B by brackets Q'—Q' respectively, which are provided with box bearings Q²—Q² respectively, a portion of the frame extending in front of the scoop R a predetermined distance and is provided with a vertically extending draw-bar Q³ rigidly connected with the frame, and provided with holes Q⁴—Q⁴ etc., to permit connection with a tractor to draw the plough. The frame is strongly braced by angle iron parts Q⁵ and sheet metal Q⁶, and is also provided with two vertically extending angle iron portions, Q⁹ and Q¹⁰ which serve to limit the movement of and guide the scoop to prevent undue lateral strains from being transmitted to the box bearings S—S' respectively carried on the axle and connected with the thrust bars T—T respectively, which in turn are connected to the back of the scoop R at its lower end.

The scoop may be raised and lowered about twelve inches by means of wire cable U—U respectively, connected to the scoop at each side thereof and to a rotatable shaft V operated by a crank V' and held by a ratchet and pawl V²—V³ as illustrated. The bottom and sides of the scoop are inclined to cause the snow to travel to the rotor W, which is carried on a shaft W' indicated in dotted lines in Figure 1, and supported in a housing W² which is fastened at one end to the scoop and at the other end to the frame I as illustrated. The wheels A—A are covered by sheet metal housings X—X respectively, and the gears by a sheet metal X' which forms a floor to carry the weight required to give tractive force to the machine.

The machine may be operated by pushing it with a power driven tractor located behind it or by pulling it with a tractor-automobile or horses.

Assuming it is to be pulled by a tractor, a rigid bar extending horizontally from the tractor and connected to the machine by passing a hook into one of the holes Q⁴ nearest in line therewith to support the frame of the plough horizontally, the scoop should be adjusted so that its front lower edge is above the ground at the desired height, by means of the crank V'. As the tractor moves forward the wheels A—A rotate and drive the gearing and fan. As the snow enters the scoop and is pressed against the rotor, it is lifted and propelled upward and deflected laterally to one side of the roadway, or into carts at one side of the machine which are moved in unison therewith.

When a cart on one side is filled, the gears may be operated through the lever J to reverse the direction of rotation of the fan and fill a cart traveling on the opposite side of the machine by changing the position of the deflecting plate K' carried by the bracket K² adjacent the top of the scoop so that the material may be discharged to the left or to the right depending upon the direction of rotation of the rotor. When the machine is being drawn from one place to another and it is not desired to operate the rotor, the gears are shifted to the neutral or disconnected position, as illustrated in Figure 1.

Y indicates a buffer element, shown as a spring in this case, and serving to prevent the scoop from being thrown upward beyond a predetermined distance. It is held between a bracket Y' fixed to the scoop and a bracket Y² fixed to the under side of the frame Q.

Z indicates a wide strip of spring metal fixed to the scoop just behind its cutting edge Z' and extending toward the back end of the machine, and serves to prevent the scoop from "digging" when in operation should it strike the earth or other obstacle. It also serves as a buffer or shoe as its free end Z² is located slightly below the cutting edge Z' of the scoop.

It is obvious that many changes may be made in the details of construction of this machine, and I do not wish to be limited to the specific detail, except where such are claimed specifically herein, but protection in all such modifications as may come within the broad scope of my invention as disclosed herein.

Having thus described my invention I claim as new and desire to secure by Letters Patent:

1. A machine of the class described comprising a frame having means for connection to the rear draw bar of a tractor, traction wheels and a driving axle for supporting the frame, a snow scoop and a rotor mounted for operation therein whereby the snow may be discharged at either side of the scoop and gearing for operating the rotor from the said axle.

2. A machine of the class described comprising a frame having converging side bars and braces therefor whereby said frame may be connected to the rear draw bar of a tractor, a pair of traction wheels and a driving axle for supporting the frame, a snow scoop and a rotor mounted for operation therein whereby the snow may be discharged through the top and at either side of the scoop, and gearing for operating the rotor from the said axle.

3. A machine of the class described comprising a frame having means for connection to the rear draw bar of a tractor, traction wheels and a driving axle for supporting the frame, a snow scoop pivotally supported from the axle, a rotor carried by the scoop whereby the snow may be discharged through the top and at either side of the frame and means for raising and lowering the scoop and gearing for operating the rotor from the said axle.

4. A machine of the class described comprising a frame having converging side bars and a front draw bar whereby it may be connected to the rear draw bar of a tractor, a pair of traction wheels and a driving axle for supporting the frame, a scoop having thrust bars connected to the back of the scoop and pivotally mounted on the said axle, means for raising and lowering the scoop, a rotor carried by the scoop for discharging the snow at either side thereof and gearing for operating the said rotor from the axle.

5. A machine of the class described comprising a frame having converging side and brace bars connected at their front ends and having a draw bar whereby said frame may be connected to the rear draw bar of a tractor, a pair of traction wheels and a supporting axle therefor, a snow scoop having thrust bars connected to the back and at the bottom of said scoop for pivotally mounting the same on the axle, means for raising and lowering the scoop, a rotor carried by said scoop and reverse gearing for operating the said rotor from the axle whereby the snow may be discharged through the top at either side of the scoop.

6. A machine of the class described comprising a frame having means for connection to the rear draw bar of a tractor, a pair of traction wheels and an axle for supporting the frame, a snow scoop and a rotor mounted for operation therein whereby the snow may be discharged at either side of the scoop and frame, reverse gearing for said rotor driven from the axle and elevating means connected to the front of the scoop.

7. A machine of the class described comprising a frame having converging side and brace bars and a connecting plate therefor whereby said frame may be connected to the rear draw bar of a tractor, a pair of traction wheels and an axle for supporting the frame, a snow scoop having a portion of its sides cut away and a rotor mounted in the rear wall of said scoop whereby the snow may be discharged over the top at either side of the frame, means pivotally supporting the scoop from the axle and frame, and elevating means connected to the front of the scoop.

8. A machine of the class described comprising a frame having converging side and brace bars including means for connecting the same to the rear draw bar of a tractor, a pair of traction wheels and an axle for supporting the frame, a snow scoop and a rotor mounted in the rear wall thereof, said scoop having its sides partially cut away whereby the snow may be discharged at either side thereof, thrust bars connected to the back of the scoop and at its lower end, box bearings for mounting the thrust bars on the said axle for pivotal movement and elevating means for raising and lowering the scoop.

9. A machine of the class described comprising a frame having converging side and brace bars and means at the front ends thereof for connection to the rear draw bar of a tractor, a pair of traction wheels and an axle for supporting the frame, a snow scoop and a rotor mounted in the rear wall thereof pivotally supported from the axle and forwardly of the traction wheels, a shaft and an operating crank mounted on the frame and cables attached to the said shaft and the sides of the scoop for raising and lowering the same and a resilient buffer attached to the scoop and frame.

10. A machine of the class described comprising a frame having converging side and brace bars and means at the front ends thereof for connection to the rear draw bar of a tractor, a pair of traction wheels and an axle for supporting the frame, a snow scoop and a rotor mounted in the rear wall thereof pivotally supported from the axle and forwardly of the traction wheels, a shaft and gear for driving the rotor, gearing on the axle, a second shaft and gearing meshing with the said gearing on the axle, a gear shifting collar for said gearing on the second mentioned shaft and means for raising and lowering the snow scoop.

Signed at New York, in the county of New York and State of New York this 11th day of December, A. D. 1923.

EDWIN B. CADWELL.